April 14, 1959      G. N. JENKS      2,882,210
ELECTROLYTIC WATER PURIFICATION PROCESS
Filed July 1, 1955      3 Sheets-Sheet 1
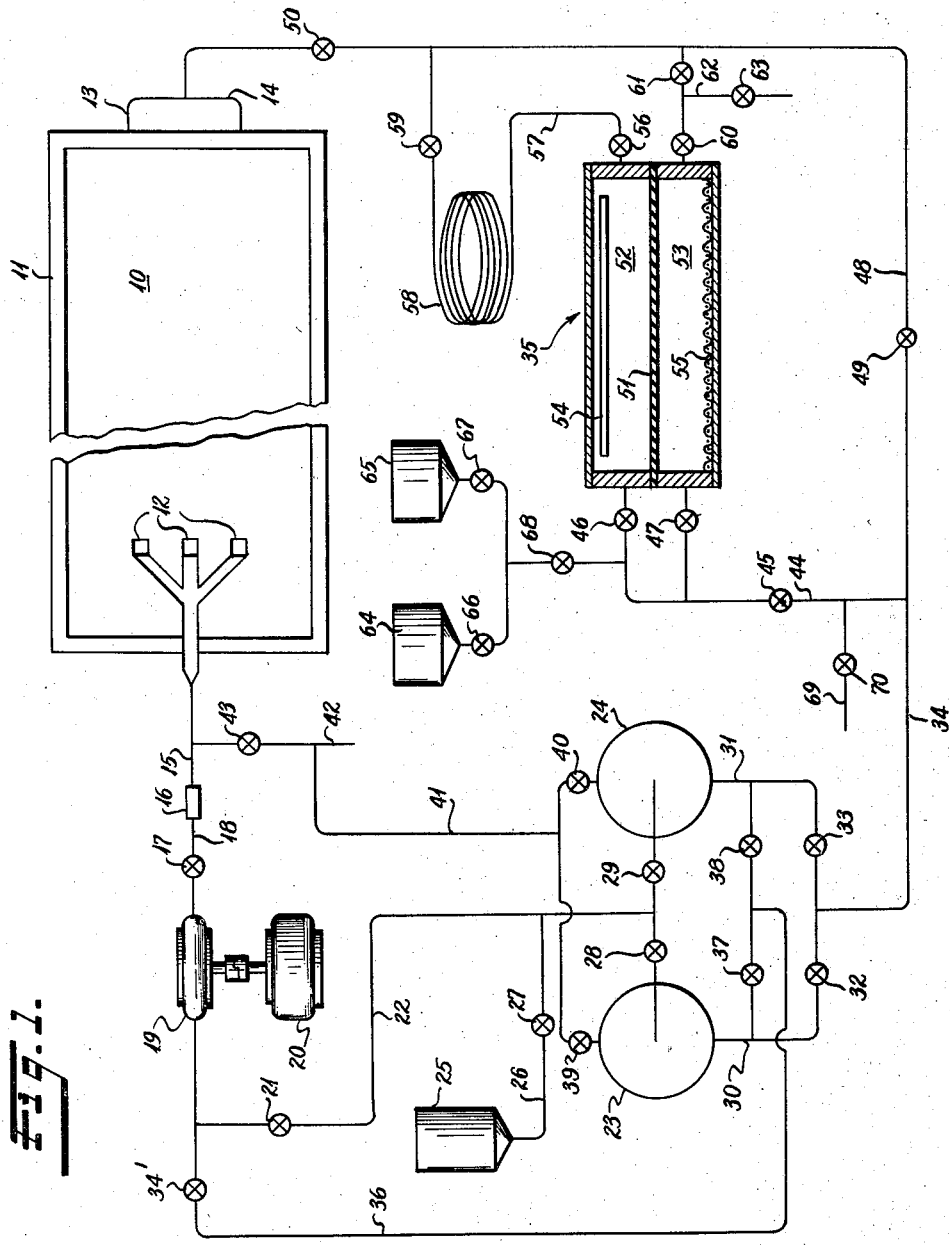
INVENTOR
GEORGE N. JENKS
BY
ATTORNEYS

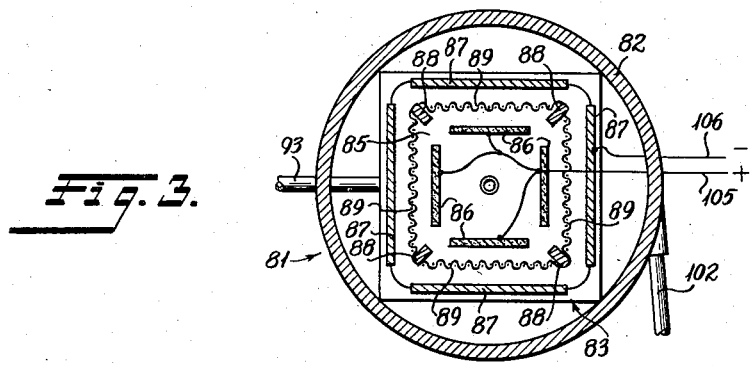
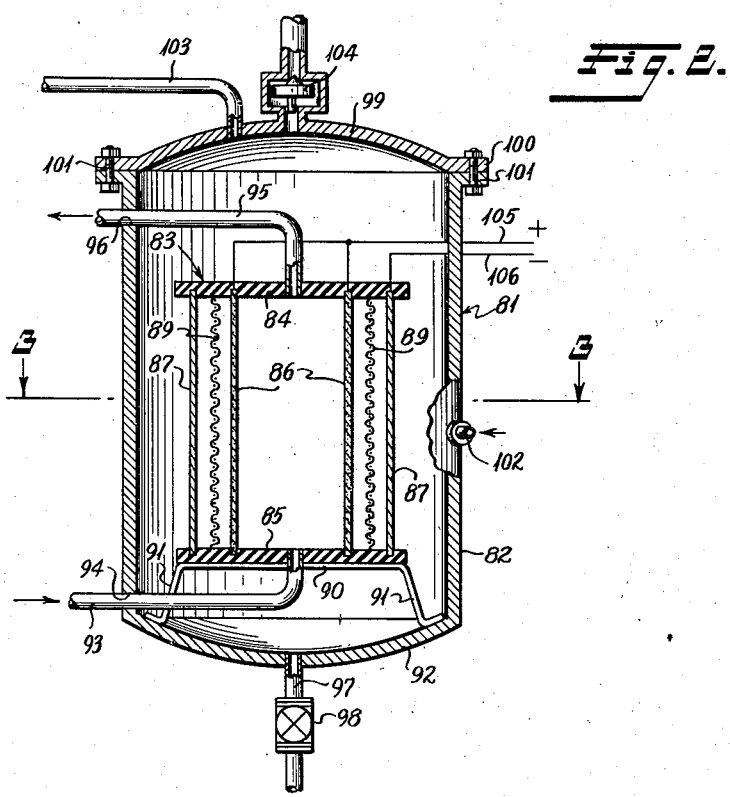

April 14, 1959  G. N. JENKS  2,882,210
ELECTROLYTIC WATER PURIFICATION PROCESS
Filed July 1, 1955  3 Sheets-Sheet 3

INVENTOR
GEORGE N. JENKS
BY
ATTORNEYS

000# United States Patent Office 2,882,210
Patented Apr. 14, 1959

2,882,210

ELECTROLYTIC WATER PURIFICATION PROCESS

George N. Jenks, West Covina, Calif.

Application July 1, 1955, Serial No. 519,586

9 Claims. (Cl. 204—151)

This invention relates to a process of purifying aqueous liquids and more particularly relates to a method of electrolytically disinfecting and sterilizing water.

The value of chlorine as a water disinfecting agent was early recognized and despite various disadvantages it is today used in the vast majority of water disinfecting installations. The present concept of the chlorination of natural waters is that chlorine remains in the water as molecular chlorine for only a very short time and then combines with inorganic reducing substances, ammonia and amines, organic substances other than amines, and water to form various compounds. The chlorine combines with water to form the three types of free available chlorine, molecular chlorine, hypochlorous acid and hypochlorite ion. These compounds are formed initially only if there are no nitrogenous compounds present in the water and if there is sufficient chlorine to satisfy the organic and inorganic demands. If nitrogenous compounds are present, they can be removed by the addition of sufficient chlorine first to form and then decompose chloramines. The reaction of the chlorine with the various reducing substances present destroys the bactericidal properties of the chlorine thus reacting and results in the so called chlorine demand. The occurrence of these reactions is a disadvantage to the use of chlorine as a disinfectant since it is necessary to provide sufficient chlorine to satisfy the chlorine demand before a reliable disinfecting action can be assured. In the treatment of swimming pool water ammonia is always present and this reacts with the hypochlorous acid to form chloramines. While these compounds possess disinfecting properties they are much less efficient bactericidally than free chlorine and require a much longer contact time in which to act.

In the treatment of swimming pool water by chlorination several procedures have become conventional. In the so called "break point" chlorination treatment sufficient chlorine is added to supply the chlorine demand of the water and then additional chlorine is added to remove the ammonia interference and to produce a residual of hypochlorous acid in the water. This hypochlorous acid is usually referred to as free chlorine as distinguished from the combined chlorine which results from reaction with the organic and inorganic reducing agents and with the ammonia. The amount of free chlorine present is commonly called the free chlorine residual of the water and in marginal chlorination is ordinarily maintained between approximately 0.1 and 0.5 p.p.m. while the pool pH is maintained between approximately 7.2 and 7.6.

Where excessive ammonia or excessive organic or other reducing agent content makes it difficult to obtain free chlorine residuals the less desirable method of maintaining a combined chlorine residual of about 2.0 p.p.m. has been resorted to.

A more recently developed method of chlorination termed the "high-free" process, involves treating the wash with chlorine or hypochlorite in sufficient dosages to create and maintain a free chlorine residual equal to or greater than 1.0 p.p.m. In order to prevent irritation to the eyes of swimmers from this high chlorine content the water is maintained alkaline at a pH of approximately 8.0 to 8.4

Chlorine for the aforementioned processes is available in several forms of which the following are most commonly used, pure chlorine gas, sodium or calcium hypochlorite in water solution, chlorinated lime, and chloramines.

In addition to such chlorination processes it has also been proposed that water sterilization be accomplished by means of bromine used alone or in combination with chlorine. Thus according to one such process chlorine is introduced into the water in a sufficent amount to maintain at least a substantial residual of available chlorine (free chlorine or chloramines) in the pool. At the same time there is originally introduced into the pool water, a quantity of a halogen of greater atomic weight than chlorine, i. e. bromine or iodine, to maintain a desired but not necessarily large concentration of bromine or iodine atoms in the pool at all times. The bromine or iodine may be in the halide form. In this process the available chlorine oxidizes at least a substantial part of the bromide or iodide to available halogen, i. e. active bromine or iodine and the available chlorine may at least in part be in the form of chloramines. The bromines or iodines converted to bromides or iodides by the residual demand of the water are then reoxidized back to the free or active state.

In addition to sterilization swimming pool water is usually subjected to filtration in order to trap all floating impurities and to lower the turbidity by retaining much of the fine suspended matter present. The filters used may be either of the pressure or gravity type and remove dirt, suspended impurities and most of the bacteria. With most water a coagulant such as alum is utilized to collect the foreign matter prior to filtration, and this is particularly true where the water contains iron, manganese, turbidity or noticeable odor. The function of the alum is to coagulate finely divided matter into larger particles which may then readily be removed by the filters. The coagulant, when added to the water, reacts with the alkalinity present, to form an insoluble jelly-like precipitate and this jelly-like substance or "floc" attracts and enmeshes the finely divided matter, including organic matter, color, and most of the bacteria. The floc is then separated from the water by the filters. Specific coagulating agents which have been used are crystal potash alum, ammonium alum, and sulphate of aluminum, the selection of the particular coagulant depending on the type of feeding equipment employed.

Since such coagulants tend to exhaust the natural alkalinity of the water, and since acid water is irritating to the skin and eyes of bathers, it has been necessary to also add an alkaline substance to maintain the proper degree of alkalinity. To this end it has been customary to feed alkali such as salsoda or soda ash to the water during its treatment.

With some natural waters, particularly those high in bicarbonate hardness, objectionable lime deposits may form on the walls of tiled pools and this is particularly true where the pool water is warmed. Such deposits often mar the appearance of the pool and are very adherent and difficult to remove. Where such deposits become troublesome the pool water is ordinarily softened by chemical softening means before use.

While the water purification processes of this invention are broadly applicable to all types of domestic and industrial water purification, they will be described particularly in connection with the purification of swimming pool water though they are not limited thereto.

According to this invention swimming pool water is sterilized through the use of an electrolytic cell which may simultaneously soften the water and adjust its alkalinity. In general, the process involves passing at least a part of the water from the pool circulating system concurrently through the anode and cathode compartments of an electrolytic cell. One or more halides is added to the water prior to its passage through the anode compartment of the electrolytic cell and this brings about the production of free halogens and particularly the active acids, hypochlorous acid, hypobromous acid, and hypoiodous acid. The effluent of the anode compartment containing highly effective bactericidal amounts of such acids is then passed through a pipe or other container to produce a sufficiently long contact time to secure the complete disinfection or sterilization of the water. So long as no appreciable amount of molecular halogen gas is allowed to escape the anolyte effluent may be maintained highly acidic and this accentuates the bactericidal action of the halogens. The mixture of a halogen with water will result in the formation of one of the aforementioned acids which will be ionized to a greater or lesser extent, depending, among other factors, on the pH of the solution. The higher the alkalinity or pH the greater is the extent of ionization and vice versa. Since the un-ionized acids constitute the bactericidal agent the bactericidal action obtained from a given amount of halogen is much greater during its contact with the acid water than during its subsequent contact with the alkaline pool water.

The thus sterilized anolyte effluent is then mixed with sufficient catholyte effluent to adjust its pH to the desired value and the mixture delivered to the pool. The halogen demand of the anolyte effluent is thus satisfied under conditions of maximum halogen efficiency so that a maximum amount of free halogen is delivered to the pool to satisfy its halogen demand and to provide the necessary free halogen residual. The return of catholyte effluent eliminates the need for pH adjustment after the water is treated with alum prior to its introduction into the filters. That is to say, the flow of catholyte effluent may be so adjusted as to provide a sufficiently high pH in the purified water to yield the desired lower pH after alum treatment and filtration.

Simultaneously with the sterilization of the water the electrolytic cell is capable of removing hardness compounds from the water by means of two phenomena. During passage of the water through the anode compartment of the cell hardness producing cations such as calcium and magnesium migrate into the cathode compartment and are removed from the system since most of the catholyte is discharged to waste. Where it is desirable to utilize larger amounts of the catholyte in the system the alkalinity in the cathode compartment may be controlled to a sufficiently high value to cause precipitation of hardness compounds such as calcium carbonate and magnesium hydroxide which may then be eliminated from the system.

There are two basic methods of operation which may be utilized in accordance with the invention. Most pool installations operate so that all of the pool water is circulated through the filters and treating equipment at least once in about six hours. According to the first method of this invention a large percentage of this water is passed through the anode compartment of the electrolytic cell while catholyte flow may either be limited to that amount necessary to secure the desired pH or may be relatively high if substantial softening is desired. Where there is a substantial flow of catholyte water softening may be carried out in the cathode compartment by precipitation. In both instances water softening will occur in the anode compartment by means of ion migration. The anolyte effluent is passed through a coil or other conduit or storage means to permit effective sterilization at a low pH and the catholyte effluent is mixed with the output from such conduit or storage means prior to its delivery to the pool. Sterlization thus occurs in an acid medium at a very high efficiency and, since a large percentage if not all of the normal pool recirculation water is thus sterilized, it is possible to continuously supply the halogen demand of the pool water and make up water largely in the sterilization equipment. The sterilized water delivered to the pool may thus contain a free halogen content lower than would be necessary if halogen demand had to be supplied in the pool at the reduced efficiency caused by the alkalinity of the pool water. The halide concentration of the water fed to the electrolytic cell may be relatively low so that the halides may be introduced either into the pool or into the water entering the anode compartment of the electrolytic cell. Where a large catholyte flow is used for water softening purposes it may be desirable to add non-dischargeable acid forming anions to the anolyte to insure that sufficient acidity is available to produce the proper pH of pool water. Soluble sulfate salts are well suited to this purpose, sodium sulfate being highly effective.

According to the second method of operation only a small percentage of the water which is ordinarily recirculated and filtered is passed through the anode compartment of the electrolytic cell while catholyte flow is very limited and is used solely to control pH. Since such a small proportion of the recirculated water is treated in the electrolytic cell the halogen demand of the pool must be satisfied in the pool at the alkalinity prevailing therein and this makes it necessary to supply an anolyte effluent containing a higher concentration of free halogen than in the preceding method. The concentration of halides in the anode compartment influent must consequently be higher and this makes it more desirable to introduce the halides into such influent rather than into the pool. Where such higher halide concentrations are used evolution of molecular halogen may be encountered which tends to reduce the acidity of the anolyte. This may be remedied by supplying to the anolyte influent some non-dischargeable acid producing anions such as any soluble sulfate. When utilizing this embodiment of the invention make up water may again be flowed through the anode compartment of the electrolytic cell and water softening again accomplished through ion migration.

Theoretical consideration of the operation of an electrolytic cell with an anolyte containing a halide, such as chlorine by way of example, would indicate that the liberation of oxygen should occur much more easily than the liberation of chlorine. Thus the reversible electrode potentials are 1.2 volts for the reaction $$2H_2O \rightarrow O_2 + 4H^+ + 4 \text{ electrons}$$

and 1.36 volts for 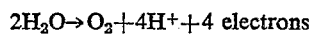 electrons. However, the overvoltage or polarization of oxygen gas evolution is much higher than that for chlorine and chlorine actually comes off more easily. It has been found that at a concentration of approximately 2,000 parts per million of sodium chloride the evolution at the anode in a slightly acid medium comprises approximately half and half oxygen gas and chlorine gas. The chlorine, of course, remains dissolved in the solution until the saturation point is reached. Where a graphite anode is used it has been found that oxygen evolution occurs in the pores of the graphite where the chloride ion has been exhausted by prior electrolysis. Graphite anodes have been found preferable where a high chlorine yield is desired and oxygen evolution may be minimized by utilizing graphite anodes which are largely non-porous.

It has also been found that the efficiency of halogen liberation is markedly increased if the anolyte contains a mixture of two or more halides. Under such circumstances the halide having the highest atomic number will be discharged at a rate higher than could be achieved with any of the halides alone. This phenomena may be utilized to obtain relatively high efficiences of halogen evolution and to reduce the amount of relatively expensive iodides and bromides which are used. Thus, since halogen liberation is limited to the halogen having the highest atomic number, while the ratio of halogen to oxygen evolution is determined by the total halide concentration, it is possible to achieve the production of effective bromine concentrations while using an anolyte of very low bromide concentration with a relatively higher chloride concentration.

In addition to the foregoing method of free bromine or iodine production in the electrolytic cell it is also within the contemplation of the invention to "bank" the pool with batch doses of bromides or iodides which are then chemically freed through the introduction of free chlorine in the effluent from the electrolytic cell.

It is therefore an object of the present invention to provide a method of sterilizing water through the use of an electrolytic cell.

It is another object of the invention to sterilize water through the use of an electrolytic cell while adjusting the hydrogen ion acitvity of such water to the desired amount.

It is another object of the invention to sterilize water through the use of an electrolytic cell while at the same time removing a large part of the hardness compounds present in the water.

It is another object of the invention to sterilize water through the use of a halide and an electrolytic cell.

It is another object of the invention to sterilize water through the use of a solution of a plurality of halides and an electrolytic cell.

Further objects and advantages of the invention will become apparent on reference to the following description and drawings wherein:

Figure 1 is a pictorial diagram of a water purification system utilizing the method of this invention;

Figure 2 is a cross-sectional view of an electrolytic cell which may be utilized in carrying out the invention;

Figure 3 is a cross-sectional view of the electrolytic cell of Figure 2 taken on the line 3—3 of Figure 2.

Figure 4:
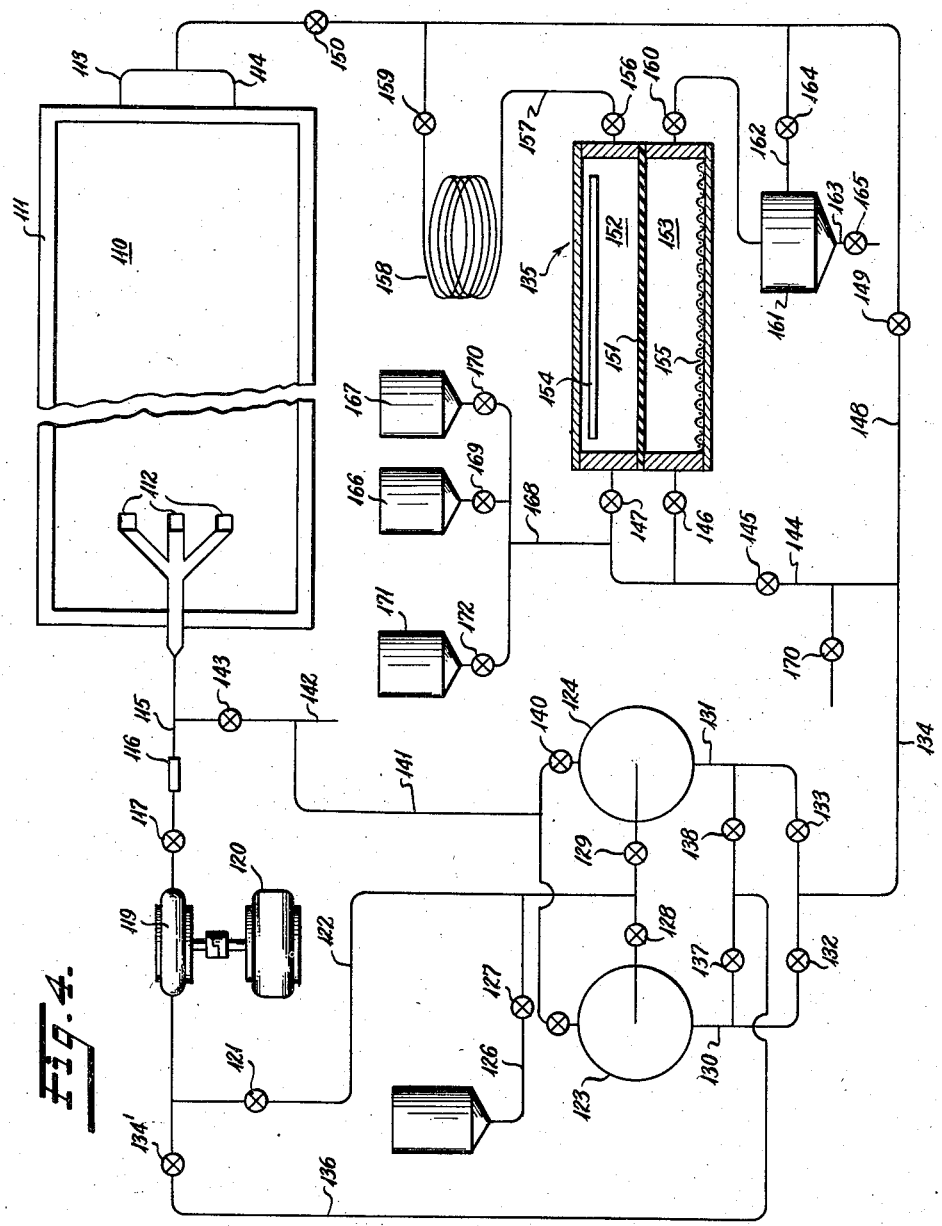
Figure 4 is a pictorial diagram of a water purification system utilizing a second embodiment of the method of this invention.

Referring more particularly to the drawings, there may be seen in Figure 1 a swimming pool 10 having the usual scum gutter 11 therearound and a set of drains 12 located therein. At the opposite end of the pool from the drains 12 may be located a series of inlet pipes 13, 14 to supply water to the pool. Water from the drains 12 is carried through the drain pipe 15 to a hair catcher 16 which prevents hair and lint from reaching the electrolytic cell and filters. Following the hair catcher 16 is a valve 17 and a pipe 18 which connects the drains 12 to the suction side of a circulating pump 19 which is driven by any suitable means such as a motor 20. The pump 19 discharges the water through a valve 21 to the feeder pipe 22 which supplies the filters 23, 24. A coagulant supply tank 25 is connected by means of a pipe 26 and a valve 27 to the feeder pipe 22 for the purpose of providing a controlled flow of coagulant to the water prior to its filtration. From the pipe 22 the water is directed into the filters 23 and 24 through a pair of valves 28 and 29. The filters 23 and 24 may be of the sand type and are provided in duplicate in order that one of the pair may be utilized in its filtering capacity while the other is being backwashed to remove collected impurities, the valves 28 and 29 being provided for this purpose. A pair of discharge lines 30 and 31 emanate from the lower portions of the filters 23 and 24 and are connected by means of valves 32 and 33 to a pipe 34 which is connected to the inlets of an electrolytic cell 35 and also to the pool inlets 13 and 14. In order that the filters might be backwashed with water from the circulating system the outlet of the circulating pump 19 is connected through a valve 34' to a pipe 36 which supplies water through valves 37 and 38 to the lower portions of the filter tanks 23 and 24. Outlets controlled by valves 39 and 40 are provided at the upper ends of filters 23 and 24 for the purpose of removing the flushing backwash water which is then drained through pipe 41 to a sewer line 42. A valve 43 is provided connecting the pool drains 12 direct to the sewer line 42 for the purpose of gravity draining the pool where desired.

The filtrate from the filters 23 and 24 which flows in pipe 34 may either be delivered to the electrolytic cell 35 or to the pool inlets 13 and 14. In order to provide for the proper division and control of these two flows there is provided a pipe 44 having a valve 45 which controls the flow of filtrate to valves 46 and 47 at the inputs of the anode and cathode compartments respectively. The filtrate flow which bypasses the electrolytic cell is carried by a pipe 48 and passes through a pair of valves 49 and 50.

The electrolytic cell 35 is divided by means of a diaphragm 51 into an anode compartment 52 and a cathode compartment 53. The anode compartment 52 contains an anode 54 while the cathode compartment 53 contains a cathode 55. The diaphragm 51 may be of any suitable material which will permit of ion transfer, a heavy cloth such as canvas ordinarily being employed. The anode may be of any suitable conducting material which is not attacked by the acidic anolyte, a preferred material being graphite; and the cathode is preferably of screen formation, such as ordinary hardware cloth of any suitable material, such as iron.

The anolyte effluent from the anode compartment 52 passes through a valve 56 and pipe 57 to an elongated pipe or coil 58. The output of the coil 58 passes through a valve 59 to the pipe 48 which supplies the pool inlets 13 and 14 through the valve 15. The effluent from the cathode compartment 53 of the electrolytic cell passes through valves 60 and 61 to the pipe 48 which supplies the pool inlets 13 and 14 through valve 50. A discharge line 62 and valve 63 are provided between valves 60 and 61 to permit the discharge of catholyte to waste.

A pair of halide supply tanks 64 and 65 are supplied having flow control valves 66 and 67. The flow from these tanks passes through a valve 68 into the inlet valve 46 of the anode compartment 52. A make-up water supply line 69 is provided connecting to pipe 44 through a valve 70.

The sterilization system illustrated in Figure 1 may be utilized with one or more halides. Where a single halide is used one of the halide supply tanks 64 or 65 may be supplied with a solution of the selected halide which may flow at a continuous control rate into the anolyte influent passing through the valve 46. Thus for instance, a solution of sodium chloride could be contained in the tank 64 and its rate of flow to the anode compartment 52 controlled by means of valves 66 and 68. Where sodium chloride is utilized as the sole halide, a rate of flow through the valve 68 should be chosen so as to provide a concentration of sodium chloride in the anolyte of at least approximately 2,000 parts per million. Chlorine will be formed in the anode compartment and the anolyte effluent containing a high concentration of hypochlorous acid passes through the elongated pipe 58 wherein sterilization is efficiently effected in the acidic anolyte. Where the actual evolution of chlorine gas is maintained at a very low rate or is substantially prevented the rate of flow of alkaline catholyte necessary to raise the pH of the anolyte effluent to a pH of 7.0 or above is relatively small and may be controlled by adjusting the valves 47, 60, 71 and 62. Some flow of catholyte is necessary to prevent the alkalinity of the catholyte from becoming so high as to cause back diffusion through the diaphragm and thus materially decrease the efficiency of operation of the cell. To provide for such flow where the amount of catholyte actually used as a pH adjustor is very small, the discharge pipe 62 and valve 63 are provided so as to make it possible to discharge the excess catholyte effluent to waste.

Example 1

A major portion of the filtrate flowing through pipe 34, in a system as shown in Fig. 1, is delivered to the electrolytic cell 35, part of such portion being introduced into the cathode compartment 53 through valve 47 and the other part being introduced into the anode compartment 52 through valve 46. Sodium chloride solution from tank 64 is introduced into the stream entering the anode compartment through valves 66 and 68, the rate of flow of such solution being adjusted to provide a sodium chloride concentration of approximately 2000 p.p.m. in the anolyte. A direct current is passed between the anode 54 and cathode 55 of the cell 35. Chlorine is formed in the anode compartment, and the anolyte effluent containing a high concentration of hypochlorous acid passes through the elongated pipe 58 wherein sterilization is effected in the acidic anolyte. The sterilized water is passed through the valve 59 and is mixed with filtrate being delivered to the pool through pipe 48. Sufficient alkaline catholyte solution is introduced into the pipe 48 through valve 61 to provide a pH approximately 7.0 after mixing with the acid anolyte.

Example 2

In the ordinary operation of the system shown in Figure 1 a major proportion of water being recirculated through the filter is passed through the electrolytic cell and the valve 49 is kept substantially closed. In contrast to the foregoing mode of operation, it is possible to operate the system shown in Figure 1 with only a small portion of the recirculated water passing through the electrolytic cell. When utilizing this alternative mode of operation the valve 49 is substantially open and the valve 45 throttled down. Under such circumstances the concentration of sodium chloride which must be maintained in the anode compartment is increased from the aforementioned value of 2000 p.p.m. so as to provide sufficient free chlorine in the anolyte effluent to satisfy the chlorine demand of the pool water in the pool. Where such higher sodium chloride concentrations are utilized and where the flow through the cell is thus reduced very little catholyte effluent flows through valves 60 and 61 and in some instances it is found desirable to supply a soluble sulphate to the anolyte in order to provide non-dischargeable acid forming anions to make up the loss of chlorine ions due to gas evolution.

Control of the free chlorine content of the anolyte effluent may be effected through variation of sodium chloride content and also through variation in flow rates and electrolytic cell voltage. While operation with sodium chloride has been described it will be understood that other halides such as bromides or iodide may be used with equal facility.

Example 3

In addition to operation with a single halide, the system shown in Figure 1 is also susceptible of operation with a plurality of two or more halides and according to such an embodiment of the invention the halide tanks 64 and 65 each contain different halides. Thus the tank 64 contains a solution of sodium chloride as in the previous operation, while the tank 65 contains a solution of sodium bromide. Ordinarily the bypass valve 49 is well throttled down so that a major proportion of the circulated water passes through the anode compartment of the electrolytic cell and this anolyte influent continuously receives a mixture of sodium chloride and sodium bromide solutions from the tanks 64 and 65. As long as some bromide remains in the anolyte, free bromine will be formed in the anode compartment rather than free chlorine and the chlorine content of the anolyte serves merely to increase the efficiency of halogen production. Thus where a major proportion of the recirculated water is being flowed through the electrolytic cell so that the halogen demand of the pool water is being supplied primarily in the elongated pipe 58, it is possible to utilize bromide concentrations in the anolyte as low as approximately 10 parts per million in conjunction with chloride concentrations as low as 1,000 parts per million. Where the flow through the electrolytic cell is materially reduced the halogen demand of the pool must be satisfied in the pool and to accomplish this a higher concentration of free halogen must be supplied to the anolyte effluent. The control of catholyte flow when utilizing a plurality of halides is subject to the same considerations as when utilizing a single halide and the catholyte control flow valves 47, 60, 61 and 63 may be controlled in accordance with the procedure set out in connection with sterilization through the use of sodium chloride.

In general the amount of free chlorine or other halogen which must be delivered to a pool to maintain satisfactory bactericidal conditions will depend upon the system of halogenation used, i. e., marginal chlorination, high-free chlorination, bromination, etc., as well as upon the size of the pool, the number of bathers, the impurities in the water and the amount of reducing agents being introduced into the pool from various sources. Because of the large number of variables involved in halogenation no satisfactory empirical relationship between free halogen in the pool and free halogen input to the pool can be established and the normal halogen input to each pool must be established for the particular pool and maintained by measurements of the free halogen actually present in the water. Accordingly the proper amount of halogen input which must be supplied by the electrolytic cells of this invention must be determined by measurement of the free halogen content of the pool water.

While the total water sterilization which must be accomplished in any particular pool to satisfy the pool demand and the total free halogen residual required will be the same for the two basic modes of electrolytic sterilization described, the amount of halide or halides actually consumed in the process will differ. Thus, according to the first embodiment of the invention a large anolyte throughput is maintained and a substantial amount of sterilization is accomplished at a very high efficiency in the acidic medium of the anolyte. When, on the other hand, operation is according to the second embodiment of the invention, a reduced anolyte throughput is maintained so that sterilization occurs largely in the alkaline pool at a reduced efficiency. Since cell throughput is reduced and since the amount of halogen or halogens required is increased, the free halogen concentration in such reduced anolyte effluent is substantially larger than that necessary when high cell throughput is used. The total free halogen supplied to the pool is increased over that necessary in the high flow method by reason of the sterilization which occurs without the pool in the latter method and also by reason of the higher efficiency of such sterilization.

Example 4

According to a further feature of the invention the system shown in Figure 1 is operated so as to supply to the pool an anolyte effluent having a free halogen content which frees a second halogen which is introduced directly into the pool water. Thus, a solution of sodium chloride is fed to the anolyte influent of the electrolytic cell to produce some form of available chlorine residual in the pool. The available chlorine should consist of some free chlorine but may at least in part be in the form of chloramines. At the same time there is originally introduced into the pool water, a quantity of a halogen of greater atomic weight than chlorine, i.e., bromine or iodine, to maintain a concentration of bromine or iodine atoms in the pool at all times. The bromine or iodine may be introduced in the halide form, i.e., as a soluble bromide or iodide. According to this procedure, the available chlorine oxidizes at least a substantial part of the bromide or iodide to available halogen thereby converting the bromide or iodide to active bromine or iodine. The available chlorine may at least in part be in the form of chloramines and where an iodide has been introduced the oxidation of iodide to iodine may be complete even though the available chlorine is all in the form of chloramines. A particularly advantageous feature of this process is that as fast as the bromine or iodine is reduced back to bromide or iodide by organic demand in the water, i.e., as fast as the reaction of bromine or iodine with undesired organisms converts the reagents to the halide form, the available chlorine in the water tends to reoxidize the bromide or iodide back to the free or active state of the halogen. In this way a desirable concentration of a rapid disinfecting agent can be maintained at all times. It is believed that this process wherein "slug" or batch doses of bromine or iodine are introduced into the pool water tends to retard the growth of algae along the walls and bottom of the pool.

In all of the foregoing methods of operation of the apparatus shown in Figure 1, control of the free halogen content of the anolyte effluent may be effectuated through control of the halide concentration of the anolyte influent as previously discussed and also through control of the anolyte flow rate and of the voltage applied to the electrodes in the electrolytic cell. Thus a higher concentration of halides will cause a higher free halogen content in the anolyte effluent; a lower flow rate will cause a higher free halogen content in the anolyte effluent; and a higher electrolytic cell current will accomplish the same result. With the system shown in Figure 1, water softening may be effectuated simultaneously with the production of free halogens through the migration of hardness cations from the anode to the cathode compartment of the electrolytic cell.

In Figure 2 there is shown a cylindrical pressure type of electrolytic cell 81 which may be utilized in place of the atmospheric pressure or gravity type electrolytic cell shown in Figure 1. The cell 81 comprises a tank 82 which may be made of light gage iron, steel or other suitable water tank material which will not be attacked by the catholyte. Mounted in tank 82 is an electrode assembly indicated generally at 83, which comprises insulating plates 84 and 85 and electrodes 86 and 87. The plates 84 and 85 are recessed on their inner faces to receive a plurality of anodes 86 and a plurality of cathodes 87. Between anodes 86 and cathodes 87 is located a series of posts 88 which are fastened to the plates 84 and 85 to support a diaphragm 89. The entire electrode assembly is mounted on a support member 90 having feet 91 resting upon the bottom 92 of the container 81. The lower plate 85 may be centrally apertured to receive a supply pipe 93 which passes through an opening 94 on the side wall of the container 82. The upper plate 84 may likewise be centrally apertured to receive a discharge pipe 95 which passes through an aperture 96 in the container 82 to enter the upper plate 84 at its center. In operation, anolyte is fed to the pipe 93 to pass through the anode compartment within the diaphragm 89 and be discharged through the pipe 95.

The bottom 92 of the container 82 may have mounted in its lowermost portion a drainage pipe 97 having a valve 98 for removing any precipitate which may accumulate in the bottom of the container 82.

The top of the container 82 is sealed by means of a lid 99 which is fastened to the container 82 by means of flanges 100 and bolts 101. Catholyte may be supplied to the container 82 through a supply pipe 102 which enters the container at approximately its midpoint and on a tangent so as to produce a swirling motion which sets up a centripetal action which tends to concentrate and position any settlement precipitates on the center portion of the bottom of the tank. The catholyte may be withdrawn from the container through a pipe 103 which passes through the lid 99.

Since gases are generated during electrolytic treatment some means of pressure relief must be provided and this may be accomplished by means of a conventional float type valve 104 mounted on the uppermost portion of the lid 99.

The electrodes 86 and 87 may be connected by means of wires 105 and 106 to a suitable source of direct current, not shown.

In Figure 4 there is shown a second embodiment of the invention which may advantageously be used where there is an excessive amount of hardness compounds to be removed from the water. Referring to the drawing, there is shown at 110 a swimming pool having the customary scum gutter 111 and a series of drains 112. A plurality of inlet pipes 113 and 114 is arranged at the opposite end of the pool from the drains in order to introduce recirculated water into the pool. Drains 112 are connected by means of a drain pipe 115 through a hair catcher 116 and valve 117 to the inlet of a circulating pump 119. The pump 119 may be driven by any suitable means such as a motor 120 and has its output connected by means of a valve 121 to a feeder pipe 122 which feeds the filters 123, 124. A coagulant supply tank 125 supplies coagulant through a line 126 and valve 127 to the water entering the filters 123 and 124. A pair of valves 128 and 129 are provided between feed pipe 122 and filters 123 and 124 in order to permit one filter to act in a filtering capacity while the other is being backwashed. The filters 123 and 124 are provided with discharge lines 130 and 131 which are connected by means of valves 132 and 133 to a supply pipe 134. Recirculating water for backwashing the filter is supplied through a valve 134' and pipe 136 which carries water from the output of pump 119 to a pair of valves 137 and 138 connected to the discharge of the filters 123 and 124. Outlets at the tops of the filters 123 and 124 are provided having valves 139 and 140 for permitting discharge of the flushing water through a pipe 141 to a sewer line 142. A valve 143 is provided connecting the drains 112 to the sewer line 142 for gravity drainage of the pool.

The filtrate from line 134 is supplied to the electrolytic cell 135 by means of a pipe 144 and valves 145, 146 and 147. Bypass around the electrolytic cell 135 is provided for through a pipe 148 and valve 149 which are connected through a valve 150 to the pool inlets 113 and 114.

The electrolytic cell 135 is divided by means of a diaphragm 151 into an anode compartment 152 and cathode compartment 153. The anode compartment contains an anode 154 while the cathode compartment contains a cathode 155 which may be of the same type as described in connection with Figure 1.

Anolyte effluent from the anode compartment 152 passes through a valve 156 and pipe 157 to an elongated pipe 158 which may conveniently be in the form of a coil. The output of the coil 158 passes through a valve 159 to the valve 150 and to the pool inlets 114 and 115. The catholyte effluent passes through a valve 160 to a precipitate settling tank 161 having a clear liquid outlet 162 and a sludge outlet 163. The flow of clear liquid is controlled by means of a valve 164 while the discharge of sludge is controlled by means of a valve 165.

A plurality of halide solution supply tanks 166 and 167 are provided and are connected to a pipe 168 by means of valves 169 and 170. A supply of soluble sulphate is provided for in a supply tank 171 which is connected through a valve 172 to the pipe 168. The pipe 168 in turn is connected to the anode compartment input through the valve 147.

*Example 5*

In general the operation of the system illustrated in Figure 4 is similar to that disclosed in Figure 1 with the exception that in this embodiment of the invention a substantial flow of catholyte is maintained in order to utilize the water softening capabilities of the cathode compartment of the electrolytic cell. Thus the catholyte influent valve 146 is so adjusted as to permit a substantial flow of catholyte through the cathode compartment 153 and the cathode effluent valve 160 is similarly adjusted to allow the precipitate containing catholyte effluent to be delivered to the settling tank 161. The precipitates of hardness compounds which precipitated in the cathode compartment under the influence of the alkalinity there produced settle in the tank 161 and may be removed through the pipe 163 and valve 165. The clear catholyte, on the other hand, continuously flows from the tank 161 through the pipe 162 and valve 164. This catholyte is then ordinarily mixed with the output of the coil 158 and returned to the pool through the inlets 113 and 114. The amount of catholyte is regulated so as to produce the desired alkalinity of pool water. Where, however, water containing extremely high concentrations of hardness compounds are encountered, it may be desirable to utilize the cathode compartment primarily in a softening capacity and where this is done the pH of the water flowing into the pool cannot be maintained at the desired alkalinity through the neutralizing effect of the anolyte alone. To this end a supply of non-dischargeable acid producing cations, such as sulphate cations may be provided by supplying the tank 171 with a soluble sulphate solution such as sodium sulphate and feeding this solution through the valve 172 and pipe 168 into the anolyte influent. Such a supply of cations provides an increased anolyte acidity and makes possible the desired pH control of the mixed anolyte and catholyte which is fed into the pool.

Whereas the foregoing methods of sterilization and disinfecting of water have been described in connection with the operation of swimming pools, it is to be understood that this has been by way of illustration and that the methods are equally adapted to the purification of drinking water or any other industrial purification problems where the sterilization of aqueous liquids is desired. It will also be obvious to those skilled in the art that while the particular apparatus for sterilization of swimming pool water has been arranged in a specific manner variations of such arrangements are possible. Thus, where pressure type electrolytic cells are used it is possible to insert the cells in the recirculating system immediately following the recirculating pump and before the filter. In those cases where substantial amounts of hardness compounds are precipitated from the water this arrangement is advantageous since it tends to remove in the filter any unsettled fine precipitate which remains in the water and which would otherwise form deposits in the pool.

Thus while this invention has been described in terms of specific apparatus and process steps, this has been for the purpose of illustration only and is not to be deemed limiting in any sense, the invention being limited solely by the scope and spirit of the appended claims.

I claim:

1. A method of sterilizing water in a direct-current electrolytic diaphragm cell having anode and cathode containing compartments comprising, adding an alkali metal halide to said water, flowing one portion of the water containing said alkali metal halide through the anode compartment of said cell as anolyte and a second portion through the cathode compartment of said cell as catholyte, passing current from said anode to said cathode to decompose said halide with release of free halogen and formation of an acidic water at the anode and with formation of an alkaline water at the cathode, retaining substantially all of said halogen in contact with the acidic anolyte water for a substantial period of time by flowing said anolyte water containing said halogen from said anode compartment and through a flow-path of substantial length to thereby effect prolonged bactericidal action upon said anolyte effluent water under acidic conditions, and then mixing the resulting sterilized anolyte water with alkaline effluent water from said cathode compartment to adjust the pH of the resulting water.

2. The method of claim 1 wherein the alkali metal halide is sodium chloride and is added to said water in a sufficient quantity to provide an NaCl content of at least 2000 parts per million prior to passage of said water through the compartments of the electrolytic diaphragm cell.

3. The method of claim 1 wherein at least two alkali metal halides are added to said water prior to flowing said water through the compartments of the electrolytic diaphragm cell.

4. The method of claim 3 wherein one of said halides is an alkali metal chloride and said chloride is added to the water in sufficient quantity to provide a chloride concentration of at least 1000 parts per million and wherein said second halide is selected from the group consisting of bromides and iodides, and is added to said water in a sufficient quantity to provide a concentration of said second halide of at least 10 parts per million.

5. The method of claim 1 wherein the quantity of alkaline catholyte effluent water mixed with said sterilized acidic anolyte water is sufficient to yield a product water having a pH of at least 7.0.

6. A method of purifying swimming pool water comprising, withdrawing some of said pool water, filtering said withdrawn water, adding an alkali metal halide to at least a part of the filtered water, flowing said part to the anode and cathode compartments of a direct current electrolytic diaphragm cell having an anode containing compartment and a cathode containing compartment, passing current from said anode to said cathode to decompose said alkali metal halide with the release of free halogen and formation of an acid water at the anode and with formation of an alkaline water at the cathode, retaining substantially all of said free halogen in contact with the acidic anolyte water for a substantial period of time by flowing said anolyte water containing said halogen from said anode compartment and though a flow-path of substantial length to thereby effect prolonged bactericidal action upon said anolyte water under acidic conditions, then mixing the purified acidic anolyte water with alkaline effluent water from the cathode compartment to adjust the pH of the resulting water, and returning the resulting water to the pool.

7. A method as set out in claim 6 wherein a soluble sulfate salt is added to the water flowing to the anode compartment of said cell so as to increase the acidity of the anolyte water by decomposition of such salt by the electrolytic action in the cell.

8. A method as set out in claim 6 wherein an alkali metal chloride and at least one additional halide selected from the class consisting of alkali metal bromides and iodides are added to the water prior to its passage through said electrolytic cell.

9. A method as set out in claim 6 wherein sufficient free halogen is incorporated in said water by the electrolytic action in the cell to supply the halogen demand of the pool water and provide a substantial free halogen residual in such water.

References Cited in the file of this patent

UNITED STATES PATENTS

| | | |
|---|---|---|
| 1,376,610 | Dow | May 3, 1921 |
| 1,598,018 | Schlumberger | Aug. 31, 1926 |
| 2,341,356 | Briggs | Feb. 8, 1944 |
| 2,535,035 | Briggs | Dec. 26, 1950 |
| 2,546,254 | Briggs | Mar. 27, 1951 |
| 2,636,852 | Juda et al. | Apr. 28, 1953 |
| 2,662,855 | Kamlet | Dec. 15, 1953 |
| 2,681,885 | Briggs | June 22, 1954 |
| 2,752,306 | Juda et al. | June 26, 1956 |